May 14, 1963     M. C. RHODES     3,089,970
DYNAMOELECTRIC MACHINE HAVING AN AIR GUIDE
AND METHOD OF ASSEMBLING THE SAME
Filed Nov. 2, 1959
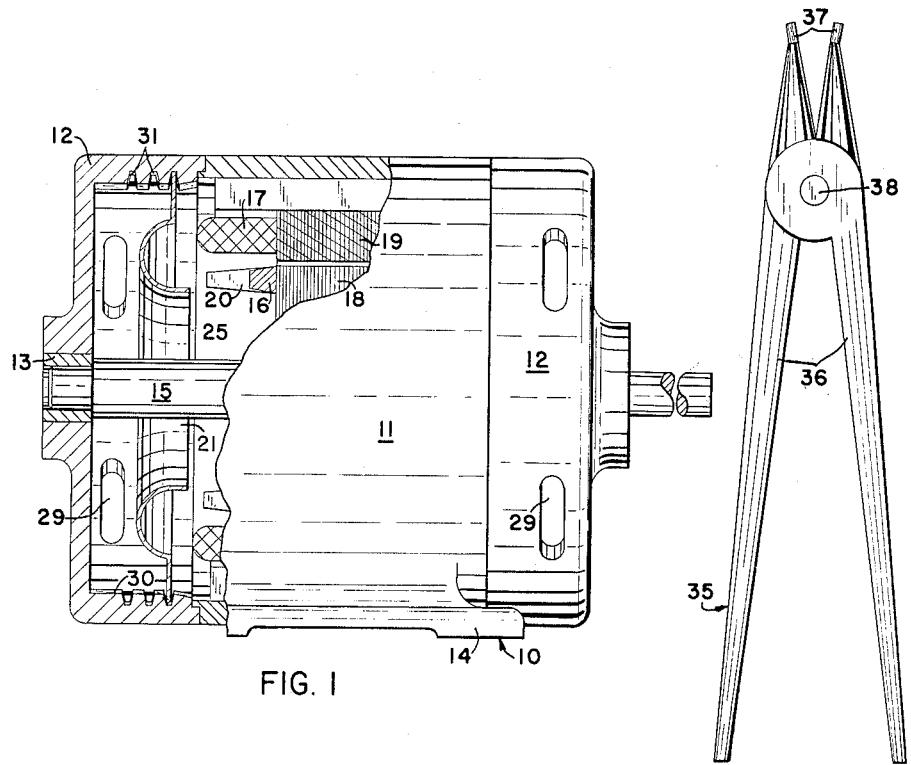
FIG. 1
FIG. 4
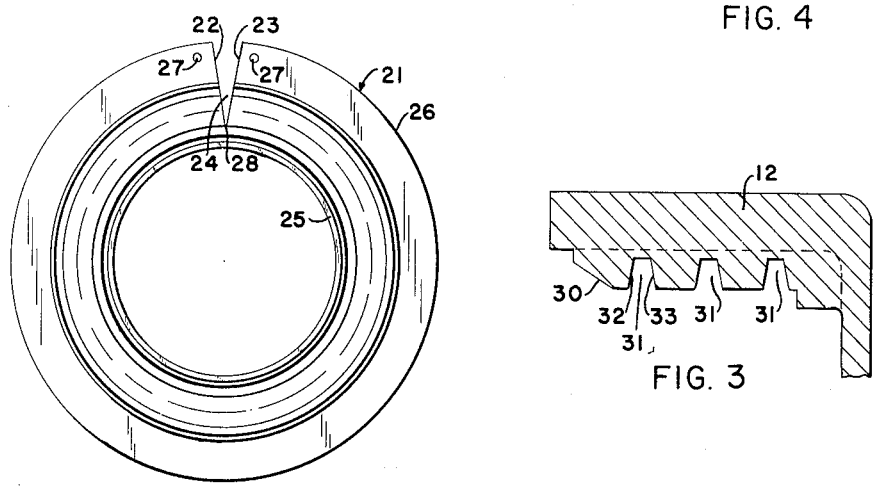
FIG. 2
FIG. 3
*INVENTOR.*
MILTON C. RHODES
BY
ATTORNEY.

United States Patent Office 3,089,970
Patented May 14, 1963

3,089,970
DYNAMOELECTRIC MACHINE HAVING AN AIR GUIDE AND METHOD OF ASSEMBLING THE SAME
Milton C. Rhodes, Jeannette, Pa., assignor to Carrier Corporation, Syracuse, N.Y., a corporation of Delaware
Filed Nov. 2, 1959, Ser. No. 850,194
10 Claims. (Cl. 310—60)

This invention relates to dynamoelectric machines having air guides. More particularly, this invention relates to an improved dynamoelectric machine having an air guide which may be located in a plurality of axial positions. This invention further relates to an improved air guide and method of assembling the air guide in a dynamoelectric machine which is economical to manufacture and simple to assemble.

In the manufacture of dynamoelectric machines, such as small size electric motors, it is desirable to reduce the number of housing sizes which must be manufactured and stocked to a minimum number. It has therefore been common practice to manufacture a single size housing for several sizes of dynamoelectric machines which is capable of receiving various sizes of electric apparatus within the housing. Proper cooling of a dynamoelectric machine requires that air be directed, usually by an air guide, onto the rotor and stator elements of the machine in an advantageous manner. It is necessary to locate the air guide in different positions depending upon the size of the electric apparatus within the housing.

Various proposals have been heretofore suggested for constructing the housing and air guide of dynamoelectric machines so that the air guide may be located in a plurality of positions depending upon the size of the apparatus which is to be located within the housing. For example, bosses of various heights have been provided on a single air guide through which securing machine screws pass in order to space the air guide at varying distances from the end cap of such a machine. It has also been proposed to employ a plurality of bosses with grooves on the inside of the housing of a dynamoelectric machine and to form notches and flanges in the outer periphery of the air guide so that the air guide may be slipped over the bosses at its notched periphery and rotated to wedge a resilient flange into the desired groove in the housing. These prior proposals have suffered from a number of disadvantages including the difficulty of properly assembling them and maintaining them in position as well as the cost of manufacture of the air guides themselves.

Accordingly, it is an object of this invention to provide an improved dynamoelectric machine having an air guide which may be disposed in a plurality of axial positions within the machine.

It is a further object of this invention to provide an improved air guide which may be inexpensively manufactured for positioning in a plurality of axial positions in a dynamoelectric machine.

It is a still further object of this invention to provide an improved method of assembling an air guide within a dynamoelectric machine.

These and other objects of my invention are achieved in the illustrated embodiment by providing a plurality of bosses on the inside of the housing of the dynamoelectric machine. Each of the bosses has a plurality of inwardly facing grooves adapted to receive an air guide in tight engagement. An air guide constructed according to this invention, may have a slot extending from its outer periphery inward so that the outer diameter of the air guide may be reduced in order to slip the peripheral portion by the boss, the peripheral portion being permitted to return to its original form after it is placed in one of the grooves corresponding to the desired axial position of the air guide.

In the drawings,
FIGURE 1 is a view partly in section of an improved dynamoelectric machine employing an air guide construction in accordance with this invention;
FIGURE 2 is a plan view of an improved air guide;
FIGURE 3 is a fragmentary sectional view of one of the bosses of a dynamoelectric machine; and
FIGURE 4 shows a tool for assembling an air guide in a dynamoelectric machine.

Referring particularly to FIGURE 1, there is shown a dynamoelectric machine having a housing designated generally at 10. The housing comprises a frame 11 and a pair of end caps 12 which may be substantially identical to each other if desired. Feet 14 may be provided on frame 11 in order to form a standard on which the machine can rest. A dynamoelectric machine constructed in accordance with the instant invention may take a number of forms but the invention is particularly adapted for use with small size electric motors.

On the interior of housing 10, preferably on the interior of end caps 12, are located a plurality of bosses 30 which extend axially of the end caps and have a plurality of inwardly open grooves 31 disposed therein. Three bosses 30 are sufficient for the purposes of this invention or alternatively, end caps 12 may be merely provided with a number of continuous grooves instead of separate bosses. Also, the grooves 31 could be provided in frame 11 if desired. In either event, each of the plurality of grooves 31 are axially spaced from one another and correspond to the positions at which it may be desired to locate air guides 21 for use with various electrical apparatus which may be disposed within housing 10. The grooves may conveniently be provided by casting or machining them into the bearing cap or frame depending on the construction of the machine. End caps 12 may form a bearing bracket for bearings 13 which support rotor shaft 15 in the housing.

Rotor winding 16 and rotor core 18 are mounted on shaft 15 and stator winding 17 is mounted with stator core 19 on frame 11. A plurality of impeller blades 20 are shown rotatable with the rotor member of the dynamoelectric machine and serve to move a cooling fluid such as air about the interior of the machine.

An air guide 21 is located within grooves 31 and has a smoothly curved surface ending at an internal aperture for the purpose of directing the cooling fluid toward impeller blades 20. Air vents 29 may be provided in the housing to allow air to enter and leave and thereby serve as the cooling fluid.

Air guide 21, which is best shown in FIGURE 2, comprises a generally circular body having an outer edge 26 and an inner edge 25 forming the central aperture referred to above. A slot 24 is formed in the air guide and extends from the outer edge 26 thereof toward the inner edge 25. As shown in FIGURE 2, slot 24 may have a pair of sides 22 and 23 converging to a point of juncture 28 which is spaced from inner edge 25. Various other configurations of slots may be employed for the purposes of this invention, it being understood that the configuration shown in FIGURE 2 is merely illustrative of a preferred embodiment. For example, the so called "point of juncture" 28, may take the form of a line or an arc as well as the point illustrated in FIGURE 2 and the term "point" is intended to be interpreted to cover various configurations of this nature. Means may be provided on the air guide for facilitating the engagement of a tool and, as shown at 27, may comprise apertures punched in the air guide near the outer edge thereof.

A detail of one of the bosses 30 is shown in FIGURE 3 and as can be seen a plurality of axially spaced grooves 31 are formed in the boss. Grooves 31 have sides 32 and 33 which may be perpendicular to the axis of end cap 12 and dynamoelectric machine 10. In the preferred embodiment of this invention however, at least one of the sides 32, 33 slope axially of boss 30 to provide an inwardly widening groove 31. As illustrated in FIGURE 3 both sides 32 and 33 may be axially sloped and serve to hold air guide 21 tightly within the end cap in a position selected. Each of the grooves 31 correspond to a desired axial position of air guide 21 in the housing of the dynamoelectric machine depending upon the size of the rotor and stator apparatus which may be used therein.

FIGURE 4 shows a tool 35 having handles 36 and nose portions 37 which are movable about a pivot 38. Nose portions 37 are constructed to fit within tool engaging apertures 27 of air guide 21.

In assembling air guide 21 within the housing of the dynamoelectric machine of this invention, it is merely necessary to determine which of the grooves 31 corresponds to the desired position of the air guide within the housing for the particular size rotor and stator being used. The air guide may then be tilted and inserted within the end cap until outer edge 26 appropriately corresponds with the selected groove 31. While holding the edge of the air guide by one hand in the proper groove, nose portions 37 of tool 35 may then be inserted in apertures 27 and handles 36 squeezed together with the other hand thereby reducing the outer diameter of air guide 21 so that it may easily be slipped by bosses 30 into axial alignment with the selected groove 31. Alternatively, the air guide may be contracted before it is inserted in the machine. The handles of tool 35 are then released and the resiliency of the material of air guide 21 causes the air guide to expand and its outer diameter increases to the previous size holding the air guide tightly into the selected groove 31. Tool 35 is then removed and the assembly operation is complete.

It will be understood that air guide 21 should be constructed of a material such that it has sufficient inherent resiliency to withstand the force which is necessarily applied to it during the assembly operation. It has been found that sheet metals such as carbon-steel are satisfactory for this purpose. It is also necessary that the force applied to reduce the outer diameter of air guide 21 not be greater than the elastic limit of the material of the air guide if its own resiliency is to assist in securing it in the proper slot 31.

Removal of the air guide may be accomplished if desired by a reverse procedure. Nose portions 37 of tool 35 are inserted in apertures 27, handles 36 are closed together thereby reducing the outer diameter of air guide 21 to a point where it may again be slipped over boss 30 and removed from the housing.

It can be seen that where the normal inherent resiliency of the air guide is relied upon to expand it into groove 31 of boss 30 it should have a normal outer diameter which is greater than the inner diameter of bosses 30. It is likewise desirable that the normal expanded outer diameter of air guide 21 be slightly greater than the inside diameter of grooves 31 in order that a very tight fit between the air guide and the housing be obtained.

The instant invention provides an air guide which can be simply and inexpensively manufactured and which can be located in a plurality of axial positions for use with various size stator and rotor elements in the housing of a dynamoelectric machine. It can also be seen that the air guide of the instant invention can be inserted or removed quickly and accurately in the desired position by unskilled labor and with a single hand tool.

While I have described a preferred embodiment of the invention, it will be understood the invention is not limited thereto since it may be otherwise embodied within the scope of the following claims.

I claim:

1. In a dynamoelectric machine, a housing, a stator and a rotor within said housing, an impeller rotatable with said rotor, means internally of said housing defining an inwardly open groove having a predetermined depth, and an air guide positioned within said housing and resiliently expanded in said groove, said air guide being adapted to be elastically reduced in external diameter to an extent greater than the predetermined depth of said groove so that it may be passed by said means defining said groove and be positioned and expanded to fit securely within said groove.

2. In a dynamoelectric machine, a housing, a stator and a rotor within said housing, an impeller rotatable with said rotor, means internally of said housing defining an inwardly open groove, and an air guide positioned within said housing and having an outer edge resiliently expanded and securely retained in said groove, said air guide having a slot extending from said outer edge whereby said air guide is adapted to be reduced in external diameter in opposition to its inherent resiliency to an extent whereby it may be passed by said means defining said groove and be positioned and resiliently expanded to be securely retained within said groove.

3. A dynamoelectric machine as defined in claim 2 wherein said groove has an axially sloping side providing an inwardly widening groove to secure said air guide in its expanded position tightly in said groove.

4. In a dynamoelectric machine, a housing, a stator and a rotor within said housing, an impeller rotatable with said rotor, means internally of said housing defining a plurality of axially spaced inwardly open grooves, and an air guide located in a desired axial position within said housing by having the outer edge thereof inserted in one of said grooves corresponding to the desired axial position of said air guide, said air guide being of resilient material, said air guide having a slot extending from said outer edge thereof so that said air guide may be reduced in external diameter against its inherent resiliency to an extent whereby said outer edge thereof may be passed by said means defining said groove and be positioned and resiliently expanded in said groove with said outer edge thereof abutting tightly against the bottom of the groove to fit said air guide securely within the desired groove.

5. A dynamoelectric machine as defined in claim 4 wherein said plurality of grooves each have an axially sloping side providing an inwardly widening groove to wedge said air guide in its expanded condition tightly in said desired groove.

6. An air guide for use in a dynamoelectric machine comprising a generally circular resilient body having a central aperture, said body being shaped to provide smooth flow of air within said machine, and a slot extending from the outer flat edge of said air guide inwardly toward said central aperture whereby said body may be contracted for assembly in said dynamoelectric machine and resiliently expanded to maintain said edge in the desired position in a groove in said machine.

7. A method for assembling an air guide in a dynamoelectric machine comprising the steps of providing a plurality of spaced bosses containing at least one inwardly open groove in the interior of the dynamoelectric machine, providing a slot extending from the outer edge of said air guide, inserting said air guide in said dynamoelectric machine with a portion of the outer edge thereof partially in a groove in one of said spaced bosses, contracting said air guide by applying a force to reduce its outer diameter, positioning said contracted air guide in said dynamoelectric machine for expansion into said groove and resiliently expanding said outer edge of said air guide into said groove by removing said force.

8. A method for assembling an air guide in a dynamoelectric machine of the type having an internal groove for the reception of the outer edge of an air guide, comprising the steps of applying a force to said air guide below its elastic limit to reduce the external diameter of said air guide, inserting said reduced diameter air guide in a desired position in said dynamoelectric machine whereby said outer edge thereof may expand into said groove and removing said force from said air guide thereby expanding the outer edge of said air guide into said groove to maintain the air guide in said desired position in said dynamoelectric machine.

9. An air guide for use in a dynamoelectric machine comprising a generally circular resilient body having a central aperture, said body being shaped to provide smooth flow of air within said machine, and a slot extending from the outer edge of said air guide inwardly toward said central aperture whereby said body may be contracted for assembly in said dynamoelectric machine and resiliently expanded to maintain the same in the desired position in said machine, said slot extending only partially through said resilient body in a direction toward said central aperture, said slot having sides converging to a point of juncture spaced from the inner edge of said body forming said central aperture when said body is in expanded condition.

10. An air guide for use in a dynamoelectric machine comprising a generally circular resilient body having a central aperture, said body being shaped to provide smooth flow of air within said machine, and a slot extending from the outer edge of said air guide inwardly toward said central aperture whereby said body may be contracted for assembly in said dynamoelectric machine and resiliently expanded to maintain the same in the desired position in said machine, said body having tool engaging means to facilitate application of a tool to contract the body.

References Cited in the file of this patent
UNITED STATES PATENTS 2,286,584    Simcox                June 16, 1942
2,809,307    Maczenski            Oct. 8, 1957